Feb. 22, 1927. 1,618,162
W. R. BARCLAY ET AL
MACHINE FOR PREPARING AND SECURING STRIPS TO SHOE PARTS
Original Filed Sept. 7, 1923   2 Sheets-Sheet 1

INVENTORS
William R. Barclay
Frank B. Kall
By their Attorney.
Nelson W. Howard

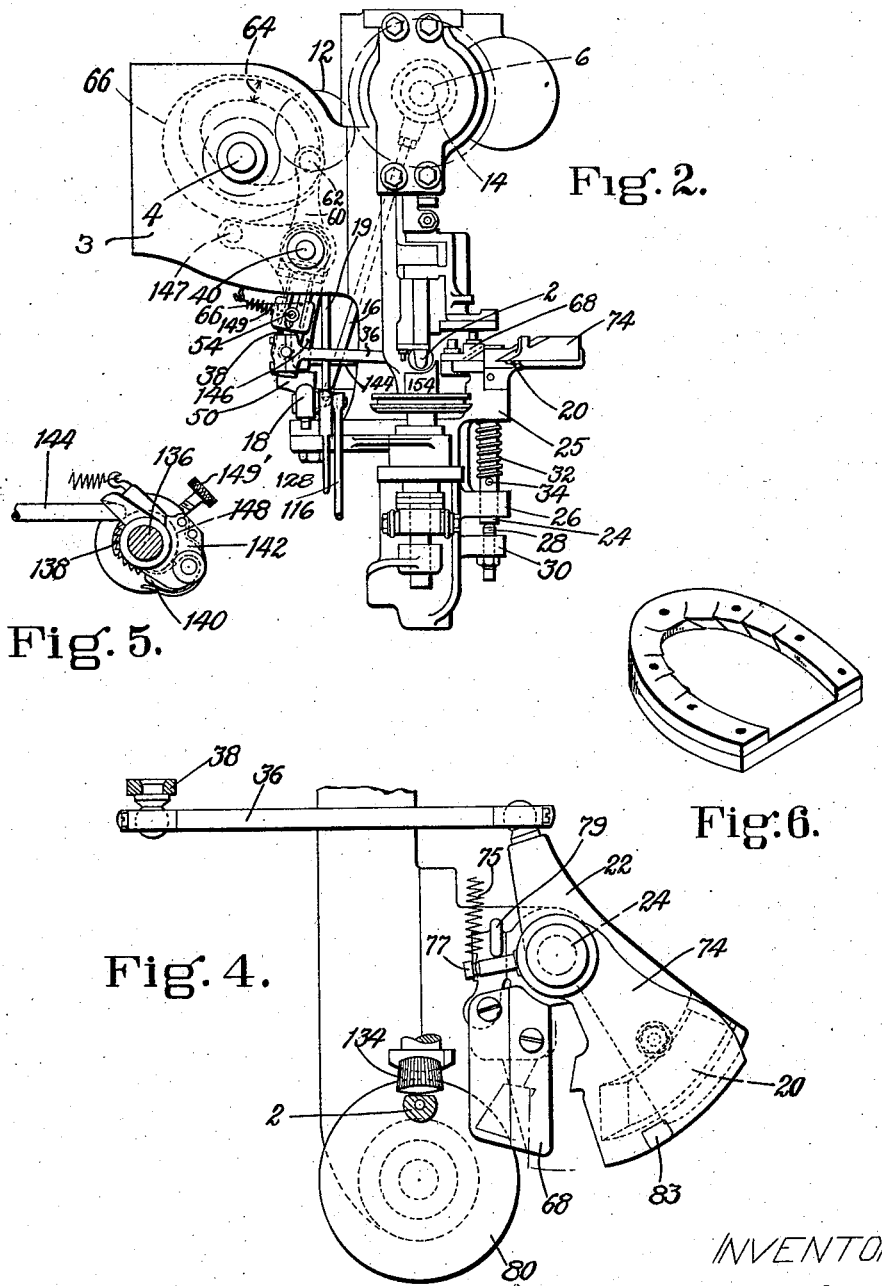

Patented Feb. 22, 1927.

1,618,162

UNITED STATES PATENT OFFICE.

WILLIAM RODERICK BARCLAY AND FRANK BYCROFT KEALL, OF LEICESTER, ENGLAND, ASSIGNORS TO UNITED SHOE MACHINERY CORPORATION, OF PATERSON, NEW JERSEY, A CORPORATION OF NEW JERSEY.

MACHINE FOR PREPARING AND SECURING STRIPS TO SHOE PARTS.

Application filed September 7, 1923, Serial No. 661,513, and in Great Britain September 25, 1922.
Renewed December 13, 1926.

This invention relates to machines for preparing and securing strips such as welts or rands to the margins of shoe parts having curved edges and is herein shown, by way of illustration, as embodied in a machine organized for slashing and securing rands or the like to heels or heel lifts. Among the objects of the present invention are to enable the strip to be more firmly secured, to reduce the number of fastenings necessary to secure a given length of strip, and to enable short lengths of strips such as taper section rands to be inserted in the machine with greater facility.

With these objects in view a feature of the invention consists of the combination, in an organization comprising mechanism for handling, feeding and inserting loose, headed fastenings such as tacks, of strip guiding means, and slashing mechanism operated to cut successive slashes in the strip as the insertion of the fastenings progresses. As illustrated herein, the organization includes work-feeding mechanism comprising a rotating work table and feed wheel between which the work and strip are clamped and by movement of which they are fed, and slashing means operated to cut progressively through the margin of the strip from one edge of the strip toward the other edge and preferably at an oblique angle to the plane of the strip. Mechanism is provided for increasing the work sustaining pressure in conjunction with the setting of the fastening inserting mechanism into operation, for example by operation of a treadle, and preferably the same treadle is utilized to control the operation of the slashing means, for example, by further movement thereof after the fastening inserting mechanism is in operation.

Another feature of the invention consists in an organization including fastening inserting mechanism for securing a strip of material along the margin of a piece of stock having a curved edge, with slashing mechanism operating to make successive slashes in the strip, to facilitate bending of the strip, at a frequency different from the operations of the fastening inserting mechanism. As illustrated herein, a plurality of slashes, for example two, are made in the strip for each fastening inserted.

Another feature of the invention consists in a novel construction of a strip or rand guide comprising a stationary and a movable portion one of which is formed to provide a guard for the slashing knife and the other of which is arranged to co-operate with the knife in making a slashing cut, with means to insure that the guide members will be separated when the machine stops to facilitate the insertion of a new strip or rand and to insure that the guide will be closed to guide the rand before the machine is started.

The above and other features of the invention will become more fully evident to those skilled in the art from the following description of a preferred form of the invention and from the appended claims.

In the drawings,

Fig. 2 is a front elevation of parts shown in Fig. 1;

Fig. 4 is a plan view showing the work support, the strip guide and the slashing mechanism;

Fig. 5 is a detail, partly in section, of the mechanism for actuating the work feeding means; and Fig. 6 is a perspective view of a piece of work upon which the machine has operated.

Figure 1:
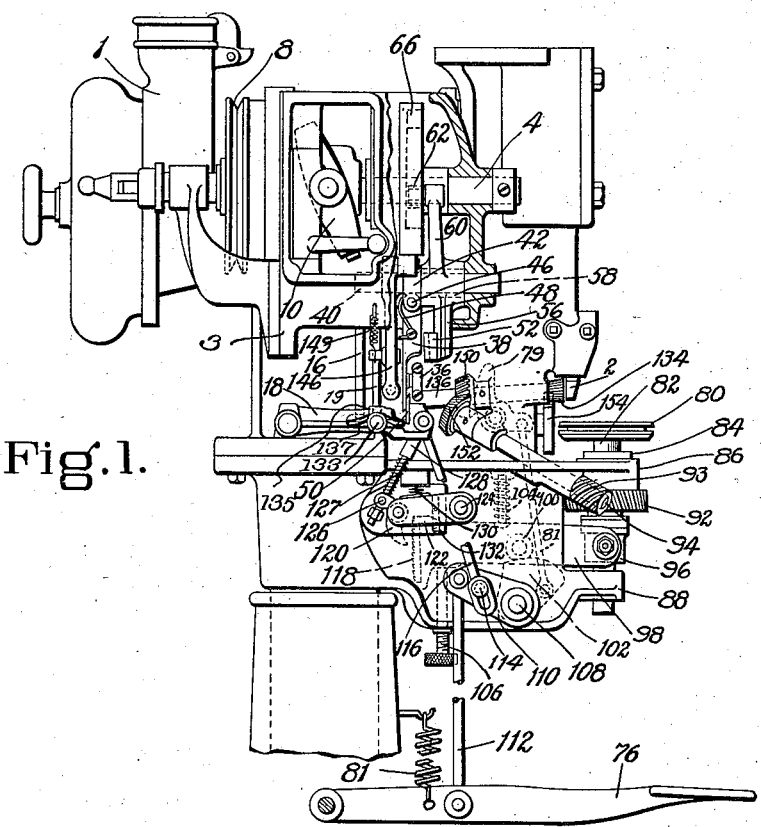
Fig. 1 is a side elevation, partly in section, of a machine embodying the present invention.

The mechanism with which the machine is provided for supplying, separating and inserting the headed fastenings, as shown by way of example, is similar to that disclosed in United States Letters Patent No. 1,106,393, granted August 11, 1914, on application of Fred L. Mackenzie. In machines of this type headed tacks are placed in bulk in a hopper 1 from which they are fed to a nozzle 2 to be driven into the work by a vertically reciprocating driver. According to the present invention, there is secured on the left-hand side of the head of the machine (Fig. 2) a casing 3 in which are bearings for a driving shaft 4 parallel to a main shaft 6 of the tacker mechanism, the driving shaft 4 having rotatably mounted upon it a driving pulley 8 which is driven from a suitable source of power. The pulley 8 may be coupled to the driving shaft 4 by a clutch 10 of any suitable type, preferably one which will cause continued operation of the machine while the treadle is held depressed and will stop the machine at a predetermined point in the cycle when the treadle is released. The main shaft 6 of the machine is driven from the driving shaft 4 through suitable gearing 12 (Fig. 2) at half the speed of the driving shaft 4, and the main shaft 6 has fixed on it an eccentric 14 which, through a connecting rod 16, controls a clutch tripping lever 18 in such a manner that if the tripping lever is released immediately after it has been actuated to set the clutch, the clutch will be automatically released only after the driving shaft has made two revolutions, that is, after the main shaft 6 has made a complete single revolution. The tripping connection between the clutch 10 and lever 18 comprises a rod 19.

A slashing knife 20 is located on the right-hand side of the machine and is fixed on an arm 22 secured to the upper end of a vertical shaft 24 mounted to rotate in bearings 25, 26 formed on the head of the machine. The shaft 24 is adjustable vertically by means of a screw 28 threaded through a lug 30 projecting from the head and located beneath the lower end of the shaft 24 which is held in engagement with the screw 28 by a spring 32 surrounding the shaft and confined between the lower face of the upper bearing 25 and a pin 34 extending through the shaft 24. The knife carrying arm 22 is connected by a horizontal link 36 to the lower end of the lower portion 38 of a two part arm 38, 42 pivotally mounted on a shaft 40 parallel to, and below the driving shaft 4. As shown in Fig. 4, the joints between link 36 and the knife carrying arm 22, and between link 36 and the lower portion 38 of arm 38, 42 are ball and slot joints so that link 36 may have the necessary transverse play. The two parts of arm 38, 42 are pivoted together by a pin 46 located beneath and transversely of the shaft 40 so that the arm as a whole can swing about the shaft 40 and the lower portion 38 of the arm can swing lengthwise of the shaft 40. The lower portion 38 of the arm is held toward the front of the machine by a suitable spring 48 and when the machine is at rest such movement is prevented by engagement of the lower end of said arm with a vertically disposed plate 50 carried by the clutch tripping lever 18, but when the clutch tripping lever is fully depressed the plate 50 is moved out of engagement with the lower portion 38 of the arm and this portion is swung, by its spring 48, lengthwise of the shaft 40 into engagement with a groove formed in the block 52 adjustably secured at 54 to the lower arm 56 of a cam lever pivotally mounted on a sleeve 58 extending from the part 42 of the two-part arm 38, 42 through which the shaft 40 passes. The upper arm 60 of the cam lever carries a roll 62 which enters a cam groove 64 formed in a cam 66 fixed on the driving shaft 4. The cam groove 64 is so formed that when the lower portion 38 of the two-part arm 38, 42 is in engagement with the groove in the block 52 one cutting movement is imparted to the slashing knife 20 during each revolution of the driving shaft 4 and, as the main shaft 6 is driven at half the speed of the driving shaft, two cuts will be made between the driving of successive tacks. The upper edge of the plate 50 of the clutch tripping lever 18 and the lower edge of the portion 38 of the two-part arm 38, 42 are suitably beveled so that when the clutch tripping arm 18 rises to release the clutch the lower portion 38 of the two-part arm 38, 42 is disengaged from the groove in the block 52 on the cam lever 56, 60.

Figure 3:
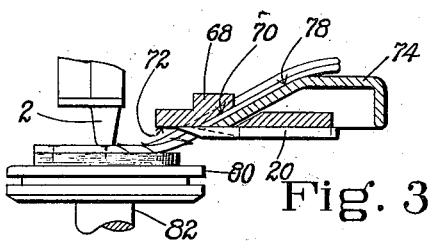
Fig. 3 is a detail, partly in section, of parts shown in Fig. 2.

The strip or rand is guided to the tacking mechanism by a stationary block 68 having a face 70 downwardly inclined from the right and upwardly inclined toward the rear of the machine (Fig. 3). A vertical face at the rear of the inclined face 70 acts as a rand edge guard. The rand passes below the inclined face 70 and then below a horizontal face 72 upon the block 68 into which the inclined face emerges. The slashing knife 20 swings about the axis of the vertical shaft 24 under the horizontal face 72 and cuts progressively through the rand for a part of its width from the edge nearest the operator toward its other edge, the knife effecting a shearing cut in co-operation with the edge formed by the junction of the inclined and horizontal faces 70 and 72 of the rand guide. The knife first enters the rand at the junction of that rand edge face nearest the operator and the bottom face of the rand and a slash is directed in the rand so as to extend forwardly and upwardly therein in the direction of feed (see Fig. 3). A knife guard 74 is rotatably mounted on the shaft 24 and is arranged to swing yieldingly toward the stationary rand guide 68 when a manually operated controller illustrated as a treadle 76 controlling the clutch 10 of the machine is depressed. The guard 74 is swung toward the stationary rand guide 68 by a spring 75 (Fig. 4) connected at one end to the head and at the other end to a pin 77 fixed in the guard 74. A bell crank lever 79 (Fig. 1) is pivoted on the head, one arm of the lever bearing against the pin 77 and the other arm being connected by a rod 81 to a treadle operated cam 102 hereinafter described, so that when the treadle is depressed to rotate the cam the bell crank lever is oscillated to allow the spring 75 to swing the guard toward the stationary rand guide, and when the treadle is released and raised by its spring 81 the bell crank lever withdraws the guard.

The guard 74 co-operates with the guide block 68 to form a rand guide, the guard having a face 78 (Fig. 3) inclined similarly to the face 70 of the block 68 and the rand passing between the two inclined faces when the guard 74 is swung toward the block 68. Projecting upwardly from the inclined face 78 of the guard 74 is an edge guide 83 (Fig. 4) which is engaged by the edge of the rand nearest the operator. The provision of this knife guard 74 admits of providing ready access to and ample clearance for the operator's fingers in adjusting the rand in its guide in the knife path without risk of accident when the knife is in operation. A rotary work table 80 is fixed on the upper end of a vertical shaft 82 which passes through a sleeve 84 to which it is keyed, said sleeve being rotatably mounted in a bearing 86 on the frame. The shaft 82 has at its lower end a second bearing 88 in the frame. The sleeve 84 has fixed on it a spiral gear 92 which is driven by a second spiral gear 93 on a shaft 94 which is rotated to turn the table by means to be hereinafter described. Between the two bearings 86, 88 the shaft 82 is reduced in diameter to form a shoulder and this shoulder rests on a collar 96 in which the shaft may rotate. The collar 96 has pivotally connected to it one end of a lever 98 which extends horizontally rearwardly and has projecting laterally from it, about midway of its length, a cam roll 100 which is held in engagement with the cam 102 by a compression spring 104 confined between the top of the lever and a lug on the frame. An adjusting screw 106 inserted through a portion of the frame supports the rear end of the lever and, by adjusting this screw vertically, the height of the work table 80 may be varied. The cam 102 is fixed on a horizontal shaft 108 extending from right to left of the machine and having fixed on its left-hand end an arm 110 which is connected by a rod 112 to the treadle 76. By depressing the treadle the work table may be raised through the cam 102 and lever 98 to clamp the work between the table 80 and a feed wheel 134, to be described, adjacent to the rigid nozzle 2 of the tacking mechanism. The arm 110 has projecting laterally from it a stud 114 which passes through the slotted end of a link 116 adjustable as to length, the other end of which is connected to the clutch trip lever 18. When the treadle 76 is depressed the slot in the link 116 allows the work table 80 to be first raised and then the clutch to be set, the spring 104 which presses the cam roll 100 on the lever connected to the table shaft 82 yielding during the continued movement of the treadle after the work is clamped between the table and nozzle. The lever 98 has at its rear end ratchet teeth 118 which are engaged by a pawl 120 pivotally mounted on an arm 122 fixed on a horizontal shaft 124 extending across the machine and rotatably mounted in bearings in the frame. The pawl 120 has an arm 126 connected by a rod 128 to the clutch trip arm 18, a spring 127 being interposed between the arm 126 and a shoulder on the rod 128 so that as the clutch tripping lever is actuated to set the clutch the pawl 120 is swung by the spring 127 into engagement with the ratchet teeth 118. The arm 122 which carries the pawl 120 is pressed down by a spring 130 and its downward movement is limited by a screw 132 threaded through the arm and located to engage a face on the frame. When the treadle 76 is depressed the strip guide is closed and the work is clamped between the work table 80 and a feed wheel 134, the teeth of which may be so sunk into the work as to permit engagement of the work with the nozzle 2. Further movement of the treadle then pulls down the clutch tripping lever 18 which immediately causes the pawl 120 to engage one of the teeth of the ratchet 118 and, as the treadle is still further depressed, the ratchet lever 98 is turned about its pivotal connection to the work table shaft 82 against the action both of the spring 104, which holds the cam roll on the lever 100 against the cam 102, and the spring 130 which depresses the pawl carrying arm 122. The work is thus firmly clamped between the feeding means and the work table 80 and during this further movement the clutch is set. When the treadle has been depressed far enough to clamp the work and set the clutch, the plate 50 on the clutch tripping lever 18 hereinbefore described has not released the lower part 38 of the two-part arm 38, 42, and therefore tacking without slashing will be performed, but if the treadle is still further depressed the plate 50 on the clutch tripping lever 18 will be withdrawn from engagement with the lower part 38 of the two-part arm and the part 38 will be swung by its spring into engagement with the block 52 on the cam lever and both tacking and slashing will be performed. The clutch tripping lever has been above referred to as a single part 18. In order, however, to give the plate 50 a sufficient component of rearward movement to pick up the lever 38 and disengage it as the plate 50 rises, the lever 18 is made in two parts pivoted together at 133 and having abutting surfaces at 135 which are held in engagement by a spring 137, the spring being stiff enough to ensure a sufficient pull on the rod 19 by movement of the lever 18 as a whole to set the clutch when the treadle is depressed. After the clutch has been tripped movement of the rear part of the lever 18 is stopped by engagement with the frame and the forepart carrying the plate 50 is swung down or up about the joint 133 to control the operation of the slashing knife as described. When the treadle is released the abutting surfaces 135 will engage and the lever 18 will be lifted as a whole by link 116 to release the clutch.

The feed wheel 134, positioned just behind the nozzle 2, is fixed on the end of a rearwardly and somewhat downwardly inclined shaft 136 having bearings in the head of the machine. The shaft 136 has fixed on its rear end a ratchet wheel 138 (Fig. 5) operated by a pawl 140 carried by an arm 142 pivotally mounted on the shaft 136 and oscillated through a link 144 connected to a cam lever 146 pivoted on the shaft 40 and having an arm carrying a roll 147 which is operated by an edge formation of the cam 66 on the driving shaft 4 (Fig. 2). A spring 149, Fig. 1, is arranged to pull outwardly on the lever 146 to hold the roll 147 against its cam. Two feed movements will therefore be imparted to the feed wheel 134 during each rotation of the main shaft 6. A shield 148 rotatably mounted on the feed wheel shaft 136 is adjustable by a set screw 149' to control the engagement of the pawl 140 with the ratchet wheel 138 and thus to determine the amount of feed movement imparted to the feed wheel. The feed wheel shaft 136 has fixed on it a gear 150 which meshes with a bevel gear 152 fixed on the rear end of the shaft 94 which, as before mentioned, carries the spiral gear 93 which drives the spiral gear 92 on the sleeve 82 which turns the work table 80.

A horizontally adjustable edge guide 154 for the rand or lift or the like is positioned behind the work table. The guide is extended above the lower edge of the feed table on the right-hand side (Fig. 2) to prevent the rand, where it is descending upon the lift, from becoming wedged between the top of the guide and the lower edge of the feed wheel.

Having described our invention, what we claim as new and desire to secure by Letters Patent of the United States is:—

1. In a machine for attaching strips to the margins of shoe parts having curved edges, the combination of means for feeding and inserting into the work a succession of headed fastenings, and means for making a succession of slashes inclined relatively to a surface of the strip as such insertion of the fastenings progresses.

2. In a machine for attaching strips to the margins of shoe parts having curved edges, the combination of means for feeding and inserting into the work a succession of headed fastenings, means for feeding the work and means for making a succession of slashes inclined relatively to a surface of the strip as the fastening inserting operation progresses.

3. A machine for attaching strips to the curved margins of shoe parts having, in combination, means for feeding and inserting into the work a succession of fastenings, and automatically operating means for making a succession of slashes in the strip at a rate different from that of the fastening insertion.

4. A machine for attaching strips to the curved margins of shoe parts having, in combination, means for feeding and inserting into the work a succession of fastenings, and means for making a succession of slashes in the strip at a greater rate than that of the fastening insertion.

5. A machine for attaching strips to the curved margins of shoe parts having, in combination, means for feeding and inserting into the work a succession of fastenings, and means for making a plurality of slashes in the strip between each two fastening inserting operations.

6. In a machine for attaching strips to the curved margins of shoe parts, the combination of means for inserting fastenings successively, and means for making in the strip a plurality of slashes between successive fastenings.

7. In a machine of the class described, the combination of means for automatically inserting successive fastenings into a work piece, means for guiding a strip to be secured by fastenings to the work piece, a slashing knife power operated to make a succession of slashes in the strip, a combined guide for the strip and guard for the knife, manually controlled means for rendering the slashing knife operative or inoperative, and connections from said means to the strip guide for controlling its operation.

8. In a machine of the class described, the combination of means for inserting successive fastenings into a work piece, means for guiding a strip to be secured by fastenings to the work piece, a slashing knife operated to make a succession of slashes in the strip, a guide for the strip arranged to open and close between the making of successive slashes, manually controlled means for rendering the slashing knife operative or inoperative, and connections from said means to the strip guide for controlling it.

9. In a machine of the class described, two shafts arranged to be operated one at twice the speed of the other, fastening inserting mechanism operated from one of the shafts, and slashing mechanism operated from the other shaft.

10. In a machine of the class described, two shafts arranged to be operated one at twice the speed of the other, fastening inserting mechanism operated from the lower speed shaft, and slashing mechanism operated from the other shaft.

11. In a machine of the class described, two shafts arranged to be operated one at twice the speed of the other, fastening inserting mechanism operated from one of the shafts, slashing mechanism operated from the other shaft, and manually controlled means for rendering the connection between the slashing mechanism and its shaft operative or inoperative.

12. In a machine of the class described, two shafts arranged to be operated one at twice the speed of the other, fastening inserting mechanism operated from the lower speed shaft, slashing mechanism operated from the other shaft, and manually controlled means for rendering the connection between the slashing mechanism and its shaft operative or inoperative.

13. In a machine of the class described, a strip guide having relatively movable portions, the one portion having a flat face, and a knife arranged for swinging movement and constituting with said face a pair of shear members operative to slash the strip.

14. In a machine of the class described, a strip guide having fixed and movable portions, the fixed portion having a horizontal face, and a knife arranged for horizontal swinging movement in the plane of said face to cooperate with said face in slashing the strip.

15. In a machine of the class described, a strip guide comprising a fixed portion and a portion mounted on a pivot to swing toward and from said fixed portion to hold a strip between them, and a knife arranged for swinging movement on said pivot to slash a strip held in the guide.

16. In a machine of the class described, the combination of a strip guide, a pivoted cutter, and means for moving the cutter relatively to the guide arranged to cause the cutter to cut obliquely through the inner edge face of the strip and progressively from said inner edge toward the other edge.

17. In a machine of the class described, the combination of a strip guide, a cutter and means for relatively actuating the guide and cutter to cut obliquely through one edge face of the strip and progressively from said edge toward the other edge.

18. In a machine of the class described, the combination of a strip guide having inclined welt guiding surfaces and bottom faces, a knife, and means for moving said knife in the plane of said bottom faces to slash the strip.

19. In a machine of the class described, the combination of a strip guide having inclined welt guiding surfaces and horizontal bottom faces, and a knife arranged to swing about an axis perpendicular to said bottom face and operated to cut progressively from one edge of the strip toward the other edge at an oblique angle to the guided portion of the strip.

20. A machine of the class described having, in combination, fastening inserting mechanism, a two-part guide for a strip to be secured by said mechanism, the guide being normally open to receive the strip, and means for closing the guide upon the strip.

21. A machine of the class described having, in combination, fastening inserting mechanism, manually operated means for controlling said mechanism, a two-part guide for a strip to be secured by said mechanism, and means for holding the guide closed upon the strip during the operation of the fastening inserting mechanism.

22. A machine of the class described having, in combination, fastening inserting mechanism, manually operated means for controlling said mechanism, a two-part guide for a strip to be secured by said mechanism, means for effecting automatic closure of the guide for holding the strip prior to setting the inserting mechanism in operation, and strip slashing mechanism, arranged to be rendered operative and inoperative by said controlling means.

23. A machine of the class described having, in combination, fastening inserting mechanism, manually operated means for controlling said mechanism, a two-part guide for a strip to be secured by said mechanism, means for effecting automatic closure of the guide upon the strip prior to setting the inserting mechanism in operation, and a slashing knife cooperating with one part of the guide to cut through the margin of the strip, said knife being arranged to be set in operation by continued movement of said manual means after the fastening inserting mechanism has been set in operation.

24. In a machine of the class described, the combination of mechanism for automatically inserting fastenings, a treadle for controlling said mechanism, a guide comprising two parts arranged to be closed upon a strip to conduct the strip to said fastening mechanism to be secured thereby, and connections from said treadle to the guide for causing the guide to be closed on the strip prior to setting the fastening mechanism in operation.

25. In a machine of the class described, the combination of a strip guide having pivoted jaws formed to guide a strip between them, and a knife forming, in cooperation with the lower face of one of the jaws, shearing mechanism operable to slash the strip in the jaws.

26. In a machine of the class described, the combination of a strip guide comprising pivoted jaws, and a knife swinging on the jaw pivot and cooperating with one jaw to slash the strip, the other jaw overlying the knife and forming a guard therefor.

27. In a machine of the class described, the combination of a strip guide having pivoted jaws formed to guide a strip between them, and a knife mounted for movement about the pivot of the jaws and cooperating with one of the jaws to slash the strip in the jaws.

28. A machine of the class described having, in combination, a strip guide having relatively movable portions, means for holding one portion away from the other portion to permit insertion of the strip, fastening inserting mechanism, a member for controlling said mechanism, and connections from said member to said holding means to cause the guide to close upon the strip when the member is actuated.

29. In a machine of the class described, the combination of a strip guide having relatively movable portions, fastening inserting mechanism, a treadle for controlling said mechanism, means including connections from the treadle to the guide to cause the guide to close upon the strip when the treadle is actuated to set the fastening mechanism in operation, a slashing knife cooperating with a part of the guide for slashing the inner margin of the strip, connections for operating the slashing knife, and means controlled by said treadle for rendering said connections operative or inoperative to actuate the knife.

30. In a machine of the class described, the combination of a power operated arm, a second arm arranged to swing transversely of the power arm into and out of actuating engagement therewith, and slashing means connected to the second arm.

31. In a machine of the class described, a shaft, two arms mounted on the shaft one of which is movable axially of the shaft into and out of engagement with the other arm, power means for operating one arm, means for engaging and disengaging the arms, and cutting mechanism operated by the arms when they are engaged.

32. In a machine of the class described, the combination of a shaft, a power actuated arm on the shaft, a second arm mounted to turn on the shaft and to swing axially of the shaft into and out of engagement with the power operated arm, a cutter connected to the second arm, and means under control of the operator for causing engagement and disengagement of the arms to set the cutter into and out of operation.

33. In a machine of the class described, the combination of fastening inserting means, a work support arranged to present work thereto, means including a spring for pressing the support upwardly, manually operated controlling means for the inserting means, and a second spring brought into action by operation of the controlling means to supplement the first spring.

34. In a machine of the class described, the combination of fastening inserting means, a work support arranged to present work thereto, a lever for raising the work support having a yielding fulcrum, a treadle arranged to control the operation of the fastening inserting means, a cam operated by said treadle for moving the lever to raise the support, and means brought into action by operation of the treadle to augment the fulcrum resistance additionally to uphold the work support against depression.

35. In a machine of the class described, the combination of fastening inserting means, a work support arranged to present work thereto, an operating lever for the work support, a spring for pressing downwardly on the lever, manually operated controlling means for the inserting means having connections to said lever between the support and the spring to push upwardly on the lever, and a second spring brought into action by operation of the controlling means to supplement the first spring.

36. In a machine of the class described, the combination of fastening inserting means, a work support arranged to present work thereto, a lever for raising the work support, a spring forming the fulcrum of the lever, a treadle arranged to control the operation of the fastening inserting means, a cam operated by said treadle for moving the lever to raise the support, and a spring brought into action by operation of the treadle to augment the first spring and acting with greater advantage to uphold the work support against depression.

37. In a machine of the class described, the combination of fastening inserting means including a nozzle and a driver reciprocable therethrough, a treadle arranged to control the operation of said fastening inserting means, a work support adjacent to said nozzle arranged to be moved by said treadle to present a work piece to said fastening inserting means, and a guide arranged to present a strip of material between the nozzle and the work piece upon the work support, said guide comprising two relatively movable parts arranged to be closed upon the strip to conduct the strip to the nozzle.

38. In a machine of the class described, the combination of fastening inserting means including a nozzle and a driver reciprocable therethrough, a treadle arranged to control the operation of said fastening inserting means, a work support adjacent to said nozzle arranged to be moved by said treadle to present the work piece to said fastening inserting means, a guide arranged to present a strip of material between the nozzle and the work piece upon the work support comprising two relatively movable parts arranged to be closed upon the strip to conduct the strip to the nozzle, and connections from said treadle to said guide arranged to cause the guide to be closed on the strip as the work support is moved to present the work piece to the nozzle.

39. In a machine of the class described, the combination of fastening inserting means including a nozzle and a driver reciprocable therethrough, a treadle arranged to control the operation of said fastening inserting means, a work support adjacent to said nozzle arranged to be raised by said treadle to present the work piece to said fastening inserting means, a guide arranged to present a strip of material between the nozzle and the work piece upon the work support comprising two relatively movable parts arranged to be closed upon the strip to conduct the strip to the nozzle, and a knife movable in contact with a surface of said guide and operable to slash the strip prior to its presentation to the work piece on said work support.

40. In a machine of the class described, the combination of fastening inserting means including a nozzle and a driver reciprocable therethrough, a treadle arranged to control the operation of said fastening inserting means, a work support adjacent to said nozzle arranged to be raised by said treadle to present the work piece to said fastening inserting means, a guide arranged to present a strip of material between the nozzle and the work piece upon the work support, said guide comprising two relatively movable parts arranged to be closed upon the strip to conduct the strip to the nozzle, a knife operable to slash the strip prior to its presentation to the work piece on said work support, and connections from said treadle to said guide arranged to cause the guide to be closed on the strip as the work support is moved to present the work piece to the nozzle and to initiate operation of said fastening inserting means, and, by further movement of said treadle, to initiate operation of said knife.

In testimony whereof we have signed our names to this specification.

WILLIAM RODERICK BARCLAY.
FRANK BYCROFT KEALL.